(12) United States Patent
Huang

(10) Patent No.: US 11,968,935 B2
(45) Date of Patent: Apr. 30, 2024

(54) GARDEN SHEARS

(71) Applicant: HO CHENG GARDEN TOOLS CO., LTD., Chang Hua Hsien (TW)

(72) Inventor: Yao-Chung Huang, Chang Hua Hsien (TW)

(73) Assignee: HO CHENG GARDEN TOOLS CO., LTD., Chang Hua Hsien (TW)

( * ) Notice: Subject to any disclaimer, the term of this patent is extended or adjusted under 35 U.S.C. 154(b) by 0 days.

(21) Appl. No.: 17/952,750

(22) Filed: Sep. 26, 2022

(65) Prior Publication Data
US 2024/0099199 A1    Mar. 28, 2024

(51) Int. Cl.
*A01G 3/02*    (2006.01)
*A01G 3/037*   (2006.01)
*A01G 3/06*    (2006.01)
*B26B 13/28*   (2006.01)
*B26B 15/00*   (2006.01)

(52) U.S. Cl.
CPC .................. *A01G 3/065* (2013.01)

(58) Field of Classification Search
CPC ...... A01G 3/021; A01G 3/037; A01G 3/0251; A01G 3/02; B26B 15/00; B26B 13/26; B26B 13/286
USPC ......... 30/250, 251, 252, 243, 244, 261, 262, 30/266, 270, 271, 188, 190, 191, 192, 30/193
See application file for complete search history.

(56) References Cited

U.S. PATENT DOCUMENTS

| | | | |
|---|---|---|---|
| 2003/0136008 A1* | 7/2003 | Lin | A01G 3/0251 30/249 |
| 2012/0186087 A1* | 7/2012 | Huang | A01G 3/0251 30/252 |
| 2014/0053413 A1* | 2/2014 | Huang | A01G 3/0251 30/252 |
| 2014/0215834 A1* | 8/2014 | Wang | A01G 3/021 30/251 |
| 2015/0237809 A1* | 8/2015 | Lin | A01G 3/0251 30/252 |
| 2016/0113208 A1* | 4/2016 | Hsu | A01G 3/021 30/251 |

FOREIGN PATENT DOCUMENTS

DE    202009001893    * 4/2009    .......... A01G 3/0251

* cited by examiner

*Primary Examiner* — Ghassem Alie

(57) ABSTRACT

A garden shears has an anvil portion, a driving arm, a blade portion and a plurality of pivot shafts. The anvil portion sandwiched an anvil, and the anvil portion and the driving arm are pivoted together by a pivot shaft. A gear and the blade portion are disposed between the driving arm. The blade portion has a straight groove and a rack portion. A pivot shaft is used to pivot the gear and the driving together is engaged and another pivot shaft passes through the straight groove and the driving arm with the pivot shaft capable of sliding in the straight groove and the gear being engaged with the rack portion to achieve the effect of a stable speed.

8 Claims, 7 Drawing Sheets

GARDEN SHEARS

BACKGROUND OF INVENTION

Field of Invention

The present invention relates to a garden shears.

Description of the Related Art

Typically, garden shears are used tools for cutting branches and leaves. Common garden shears only have a simple structure of a single pivot shaft, and utilizes the lever principle to perform labor-saving shearing operations. But with this kind of repetitive labor, the garden shears needs more labor-saving movement.

However, when the conventional garden shears perform mechanical movements, due to the different acceleration of the mechanical movement and the direction of the speed, the speed may be uneven and uneven, and the user may feel the pressing force and the sudden change between the speed in use for a long time, which causes the user's fatigue. It is very important to maintain the stable cutting speed of the garden shears for long-term gardening work.

Therefore, it is desirable to provide a garden sprayer with a handle positioning structure to mitigate and/or obviate the aforementioned problems.

SUMMARY OF THE INVENTION

An objective of present invention is to provide a garden shears which is capable of improving the above-mention problems.

In order to achieve the above mentioned objective, a garden shears comprising an anvil portion, a driving arm, a blade portion and a plurality of pivot shafts.

The anvil portion comprises a combination of two side members, each of the side members having a first pivot hole and a second pivot hole, and an anvil is sandwiched between the two side members.

The driving arm comprises a combination of two driving members, the two driving members having a third pivot hole, a first securing hole and a second securing hole; a pivot shaft passes through the second pivot hole and the third pivot hole to pivot the anvil portion and the driving arm together, the two driving members sandwiching two positioning members with a first positioning hole and a second positioning hole, and a gear and a blade portion are disposed between the two positioning members.

The blade portion has a blade, a fourth pivot hole and a straight groove with a rack portion, a pivot shaft passing through the first pivot hole and the fourth pivot hole such that the anvil portion and the blade portion are pivoted together, the gear and the rack portion engaging with each other; a second pivot shaft passes through the first securing hole, the first positioning hole, and the gear such that the two positioning members, the gear and the two driving members are assembled together, and a third pivot shaft passes through the second securing hole, the two positioning holes, and the straight grooves such that the two positioning members are secured and the pivot shaft is capable of moving along the straight groove.

Other objects, advantages, and novel features of invention will become more apparent from the following detailed description when taken in conjunction with the accompanying drawings.

DETAILED DESCRIPTION OF THE PREFERRED EMBODIMENT

Figure 5:
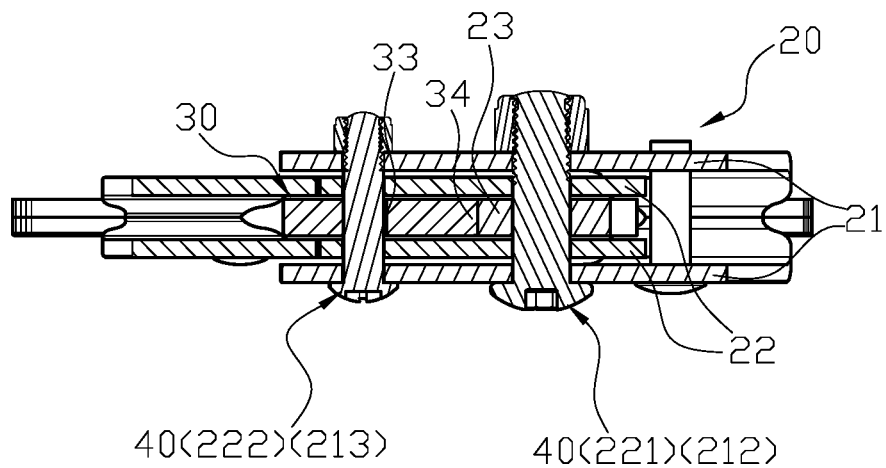
FIG. 5 is a top cross-sectional view of the location piece of the preferred embodiment according to the present invention.
Figure 6:
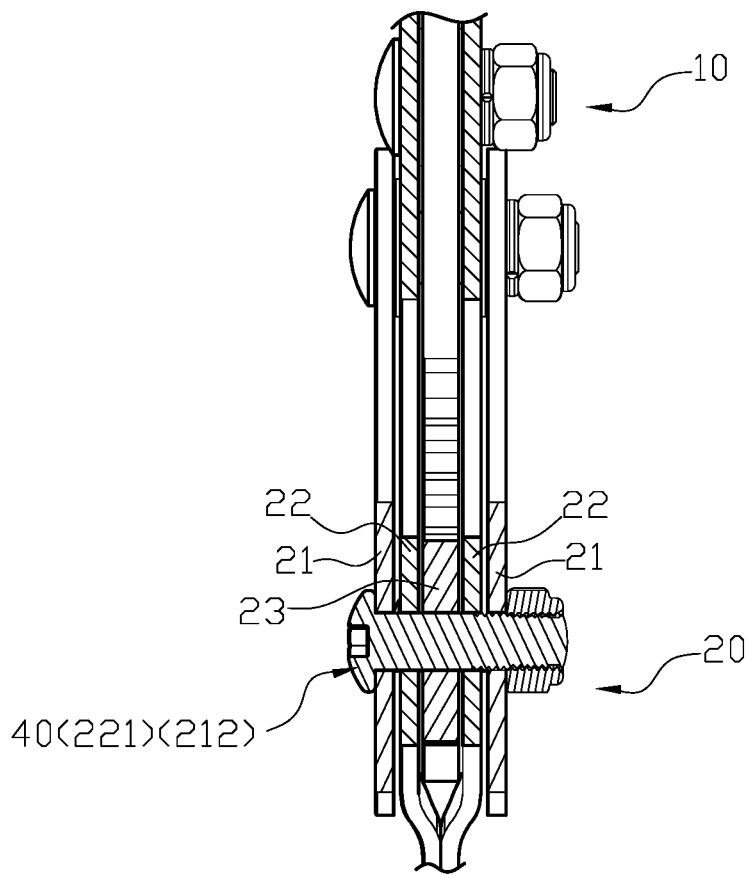
FIG. 6 is a side cross-sectional view of the positioning member of the preferred embodiment according to the present invention.

First, please refer to FIGS. 1-4. A garden shears comprises an anvil portion 10, a driving arm 20, a blade portion 30, and a plurality of pivot shafts 40. The anvil portion 10 comprises a combination of two side members 11, each of the side member 11 having a first pivot hole 111 and a second pivot hole 112, and the two side members 11 sandwich an anvil 12 therebetween. The driving arm 20 comprises a combination of two driving members 21, and the two driving members 21 each have a third pivot hole 211, a first securing hole 212, and a second securing hole 213. A pivot shaft 40 passes through the second pivot hole 112 and the third pivot holes 211 to pivot the anvil portion 10 and the driving arm 20 together. The two driving members 21 sandwich two positioning members 22, and each of the two positioning members 22 has a first positioning hole 221 and a second positioning hole 222. Furthermore, a gear 23 and the blade portion 30 are disposed between the two positioning members 22. The blade portion 30 has a blade 31, a fourth pivot hole 32, a straight groove 33, and a rack 34, and a pivot shaft 40 passes through the first pivot hole 111 and the fourth pivot hole 32 such that the anvil portion 10 and the blade portion 30 are pivoted together. The gear 23 and the rack portion 34 engage together. As shown in FIG. 5 and FIG. 6, a pivot shaft 40 passes through the first securing hole 212, the first positioning hole 221 and the gear 23 such that the two positioning members 22, the gear 23, and the two driving members 21 are assembled together. Another pivot shaft 40 passes through the second securing hole 213, the second positioning holes 222, and the straight groove 33 such that the two positioning members 22 are secured and the pivot shaft 40 is capable of moving along the straight groove 33.

Figure 3:
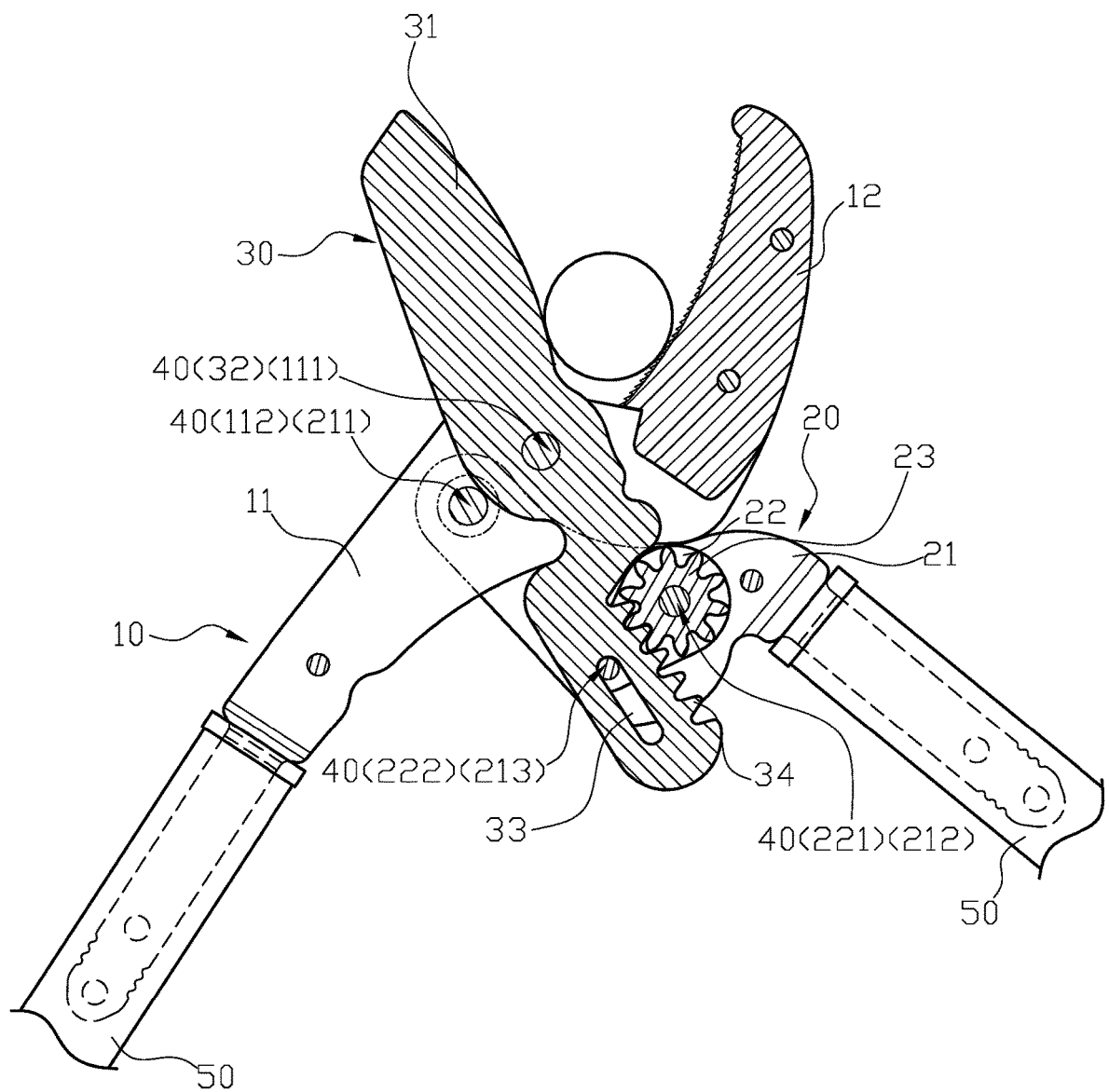
FIG. 3 is one of the front cross-sectional view of the preferred embodiment and showing the open state of the scissors according to the present invention.
Figure 4:
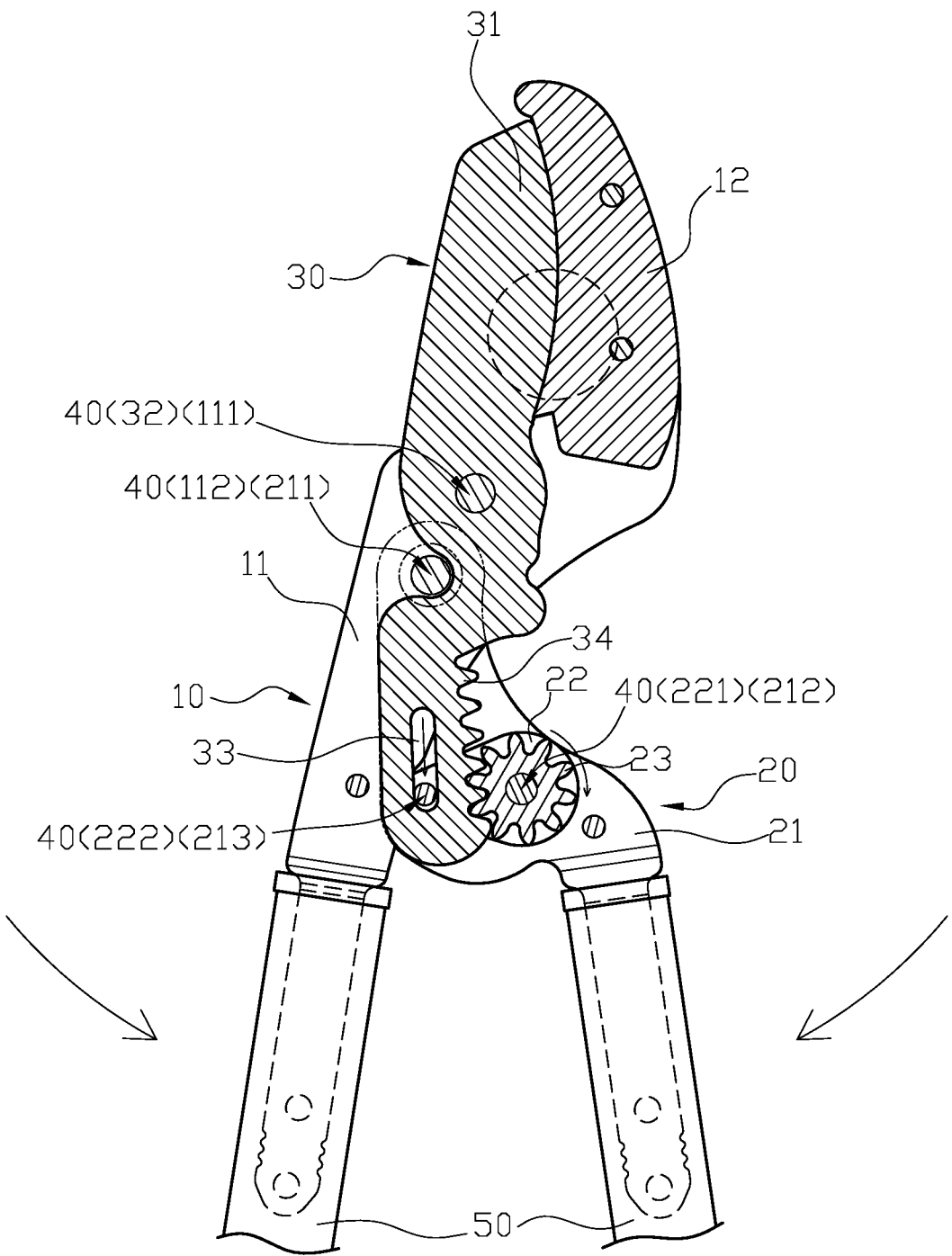
FIG. 4 is another of the front cross-sectional view of the preferred embodiment and showing the closed state of the scissors according to the present invention.

As shown in FIG. 3 and FIG. 4, with the above structure, when in use, the gear 23 and the rack portion 34 engage together and move linearly, and the pivot shaft 40 slides linearly in the straight groove 33. When the driving arm 20 is rotated, the pivot shaft 40 slides in the straight groove 33 to drive a relative rotation between the anvil portion 10 and the blade portion 30, so that the anvil portion 10, the driving arm 20, and the blade portion 30 perform a stable mechanism movement. With the anvil 12 abuts on the plant branch, the anvil portion 10 and the driving arm 20 rotate to open and close the anvil portion 10 and the blade portion 30, and the anvil 12 and the blade 31 achieves the function of cutting the plant branch. The pivot joint of the anvil portion 10 and the blade portion 30 is used as a fulcrum, and when the driving arm 20 is pressed down to close the anvil portion 10 and the blade portion 30, the pivot shaft 40 applies approximately vertical force to the straight groove 33, so that the maximum force can be generated for shearing. Moreover, while the gear 23 engages with the rack portion 34 for rotation, the speed of the pivot shaft 40 sliding in the straight groove 33 can be stabilized which makes the movement speed of the mechanism stable and stabilizes the speed of opening and closing the anvil portion 10 and the blade portion 30.

As shown in FIG. 5 and FIG. 6, the gear 23 is securely sleeved on the pivot shaft 40 while being sandwiched by the positioning members 22 to avoid sliding away. In addition, the positioning member 22 is capable of bearing the force from the gear 23 and the blade portion 30 in the axial direction when cutting hard branches, which avoids damages to the shearing structure of the garden shears and has the effect of prolonging the service life.

Figure 1:
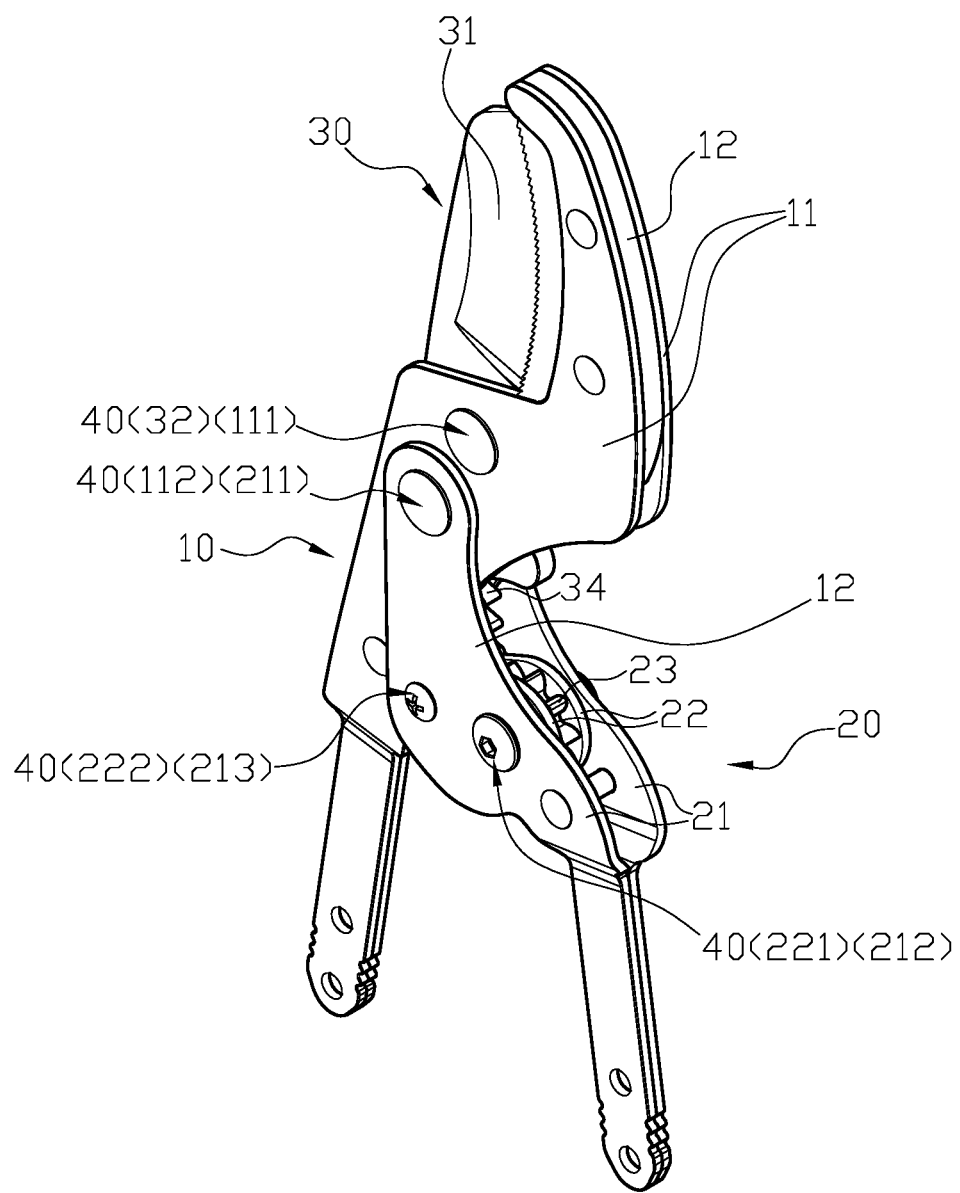
FIG. 1 is a perspective view of a preferred embodiment according to the present invention.
Figure 2:
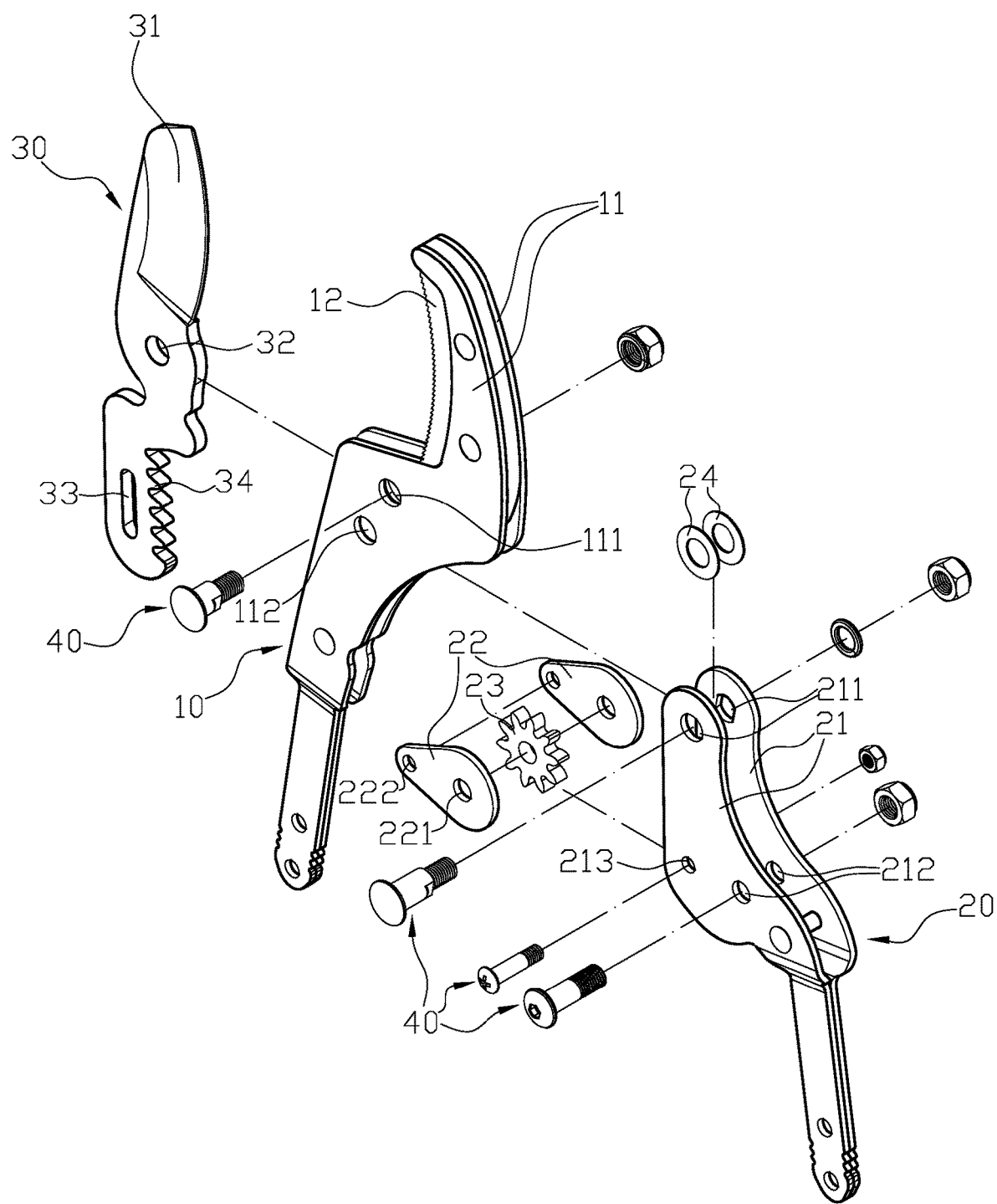
FIG. 2 is an exploded view of the preferred embodiment according to the present invention.

As shown in FIG. 2, a washer 24 is respectively disposed between the two side members 11 and the two driving members 21.

Figure 7:
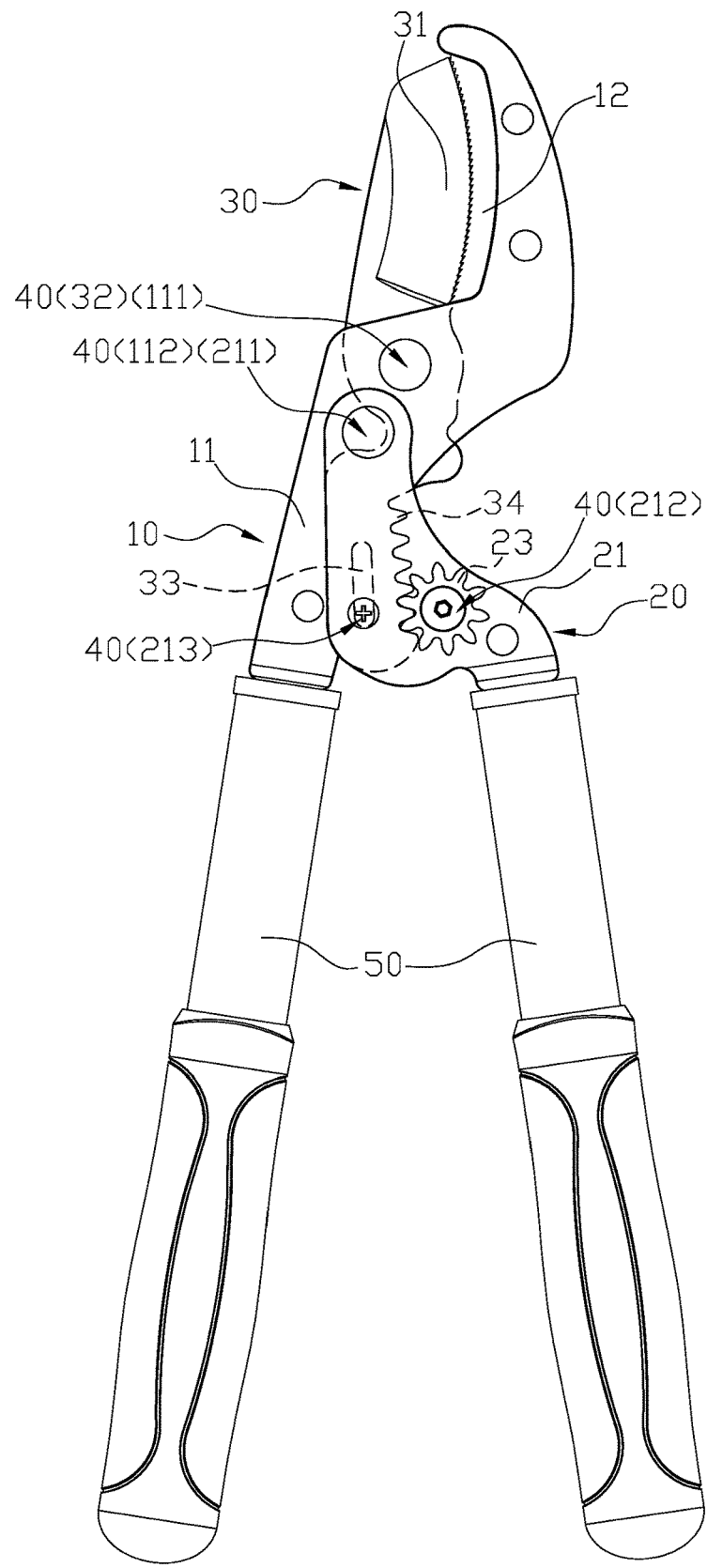
FIG. 7 is the front view of the preferred embodiment according to the present invention.
Figure 8:
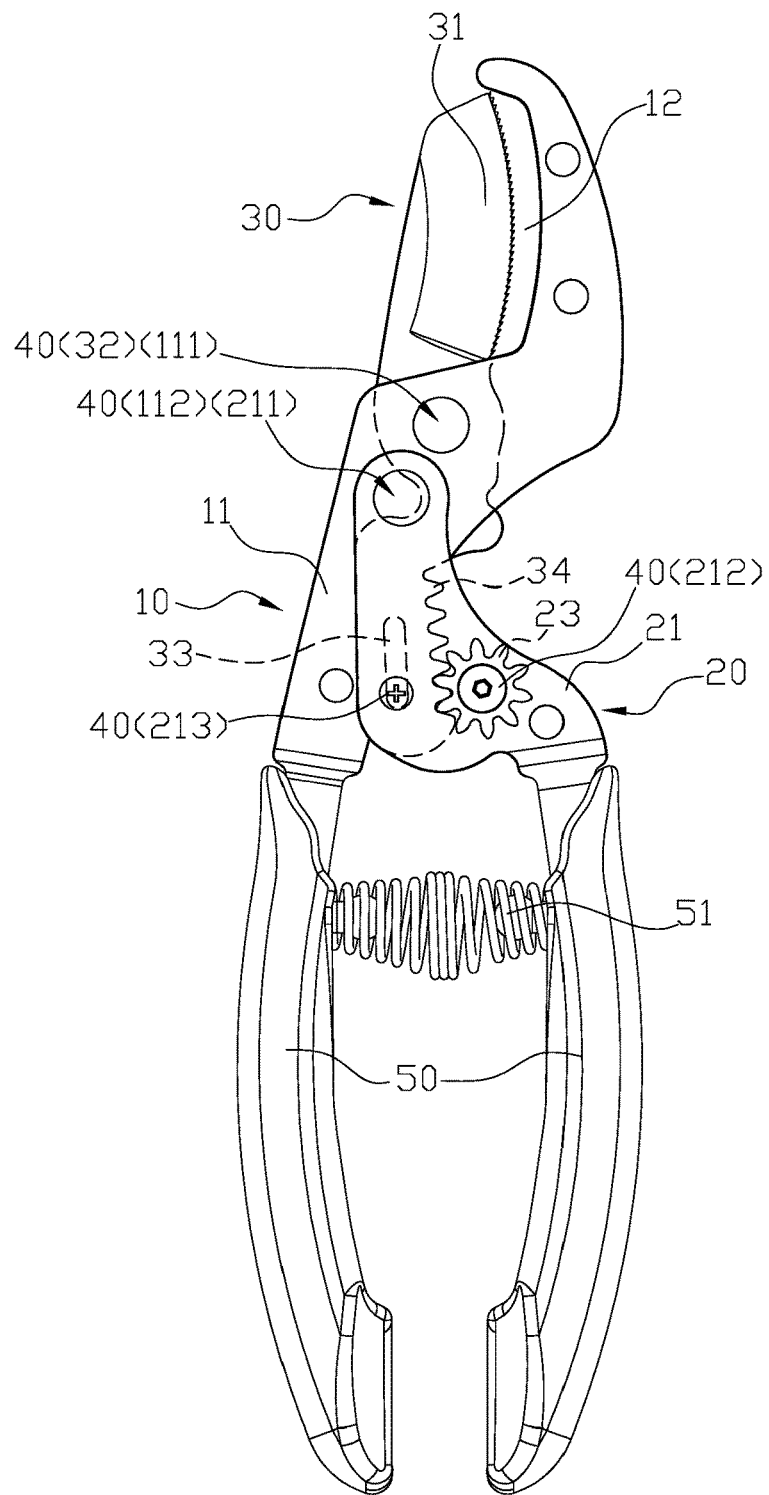
FIG. 8 is the front view of another embodiment according to the present invention.

As shown in FIGS. 7 and 8, both of the anvil portion 10 and the driving arm 20 respectively comprises a handle 50.

Again, as shown in FIG. 7, a length of the handle 50 is about 1 to 3 times a length of the anvil portion 10.

Moreover, the handle 50 has an adjustable length.

Again, as shown in FIG. 8, a length of the handle 50 is about a palm length, and an elastic member 51 is disposed between the handles 50.

Furthermore, the pivot shaft 40 comprises a pair of screw and nut.

With the above structure, the garden shears has the following advantages: When the driving arm 20 is pressed down to close the anvil portion 10 and the blade portion 30 together, while the closing is approaching completion the direction of the force given to the straight groove 33 by the pivot shaft 40 is close to vertical, so that the maximum force can be applied for shearing. Secondly, when the gear 23 and the rack portion 34 engage and rotate, the speed of the pivot shaft 40 sliding in the straight groove 33 linearly is stabilized, so that the movement speed of the mechanism is stable, which further stabilizes the speed of opening and closing the anvil portion 10 and the blade portion 30, and achieves the stability in use. Also, the positioning members 22 sandwich the gear 23, so the gear 23 is stably set on the pivot shaft 40 not sliding along the axial direction, and when cutting hard branches, the positioning member 22 can bear the force of the gear 23 and the blade portion 30 in the axial direction, thereby avoiding the structure of garden shears from being damaged. Last, the handle 50 can be long or short in order to be used with two hands or one hand, such that the garden shears can be used for cutting leaves or branches.

Although the present invention has been explained in relation to its preferred embodiment, it is to be understood that many other possible modifications and variations can be made without departing from the spirit and scope of invention as hereinafter claimed.

What is claimed is:

1. A garden shears comprising an anvil portion, a driving arm, and a blade portion, wherein:
   the anvil portion comprises a combination of two side members, each of the side members having a first pivot hole and a second pivot hole, and an anvil is sandwiched between the two side members;
   the driving arm comprises a combination of two driving members, the two driving members each having a third pivot hole, a first securing hole, and a second securing hole;
   a first pivot shaft passes through the second pivot hole and the third pivot holes to pivot the anvil portion and the driving arm together, the two driving members sandwiching two positioning members each having a first positioning hole and a second positioning hole, and a gear and the blade portion are disposed between the two positioning members;
   the blade portion has a blade, a fourth pivot hole, a straight groove, and a rack portion, a second pivot shaft passing through the first pivot hole and the fourth pivot hole such that the anvil portion and the blade portion are pivoted together, the gear and the rack portion engaging with each other;
   a third pivot shaft passes through the first securing holes, the first positioning holes, and the gear such that the two positioning members, the gear and the two driving members are assembled together, and a fourth pivot shaft passes through the second securing holes, the second positioning holes, and the straight groove such that the two positioning members are secured and the fourth pivot shaft is capable of moving along the straight groove.

2. The garden shears as claimed in claim 1, wherein a washer is respectively disposed between the two side members and the two driving members.

3. The garden shears as claimed in claim 1, wherein both of the anvil portion and the driving arm respectively comprises a handle.

4. The garden shears as claimed in claim 3, wherein a length of each handle is about 1 to 3 times a length of the anvil portion.

5. The garden shears as claimed in claim 3, wherein each handle is configured to be gripped by a palm of a user.

6. The garden shears as claimed in claim 5, wherein an elastic member is disposed between the handles.

7. The garden shears as claimed in claim 3, wherein an elastic member is disposed between the handles.

8. The garden shears as claimed in claim 1, wherein each of the first pivot shaft, the second pivot shaft, the third pivot shaft, and the fourth pivot shaft comprises a threaded shaft and a nut.

* * * * *